Figure 1:
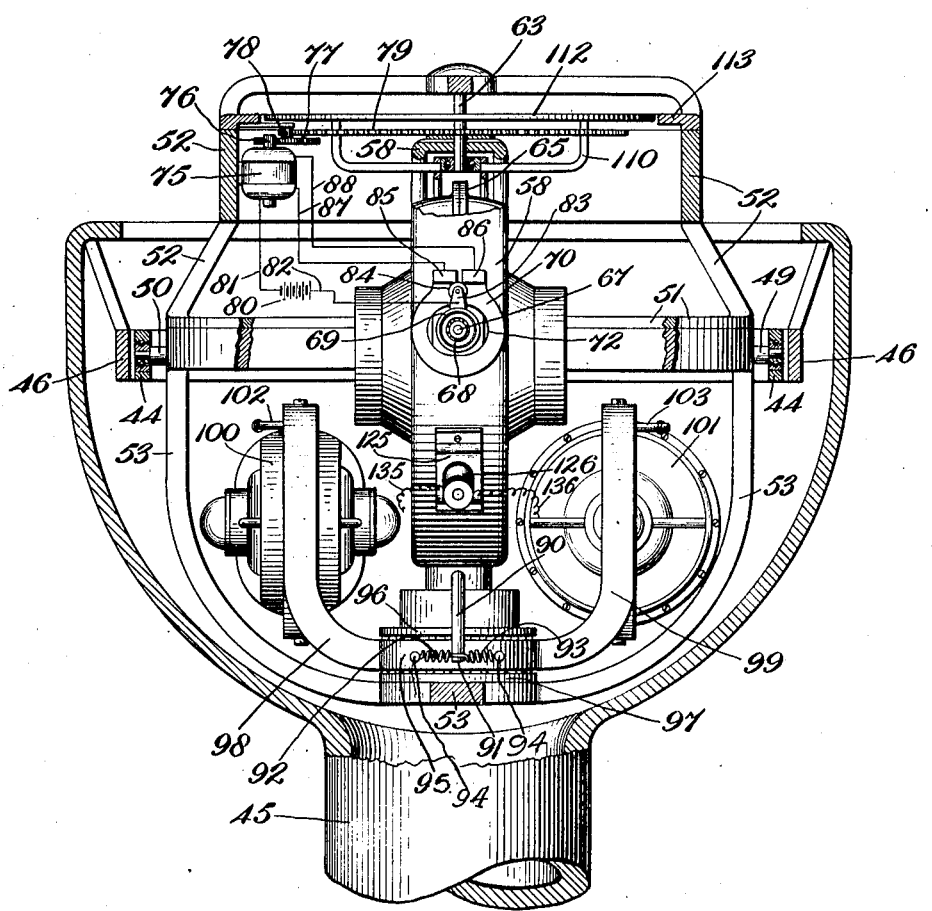

J. E. BEATTIE.
DAMPENING DEVICE FOR GYROSCOPIC COMPASSES.
APPLICATION FILED MAY 23, 1918.

1,308,693.

Patented July 1, 1919.
2 SHEETS—SHEET 1.

Inventor
John E. Beattie, by
Attorney

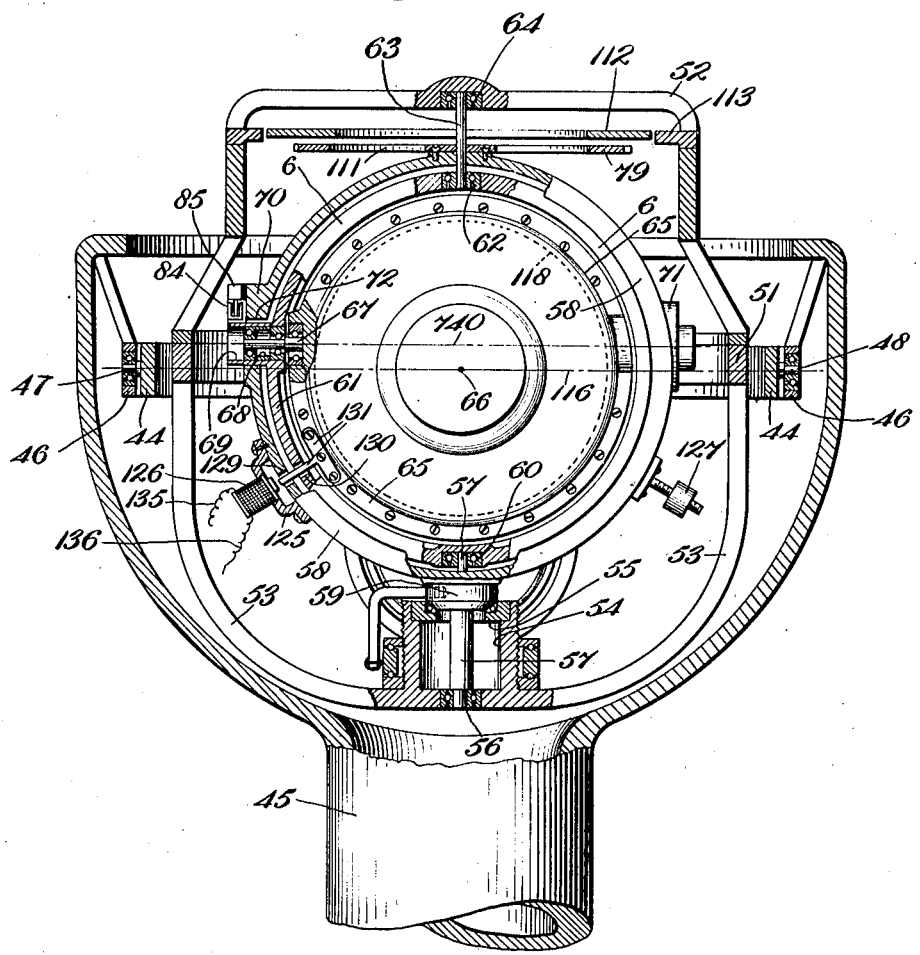

UNITED STATES PATENT OFFICE.

JOHN E. BEATTIE, OF NEW YORK, N. Y., ASSIGNOR TO THE CARRIE GYROSCOPIC CORPORATION, OF NEW YORK, N. Y., A CORPORATION OF NEW YORK.

DAMPENING DEVICE FOR GYROSCOPIC COMPASSES.

1,308,693.  Specification of Letters Patent.  Patented July 1, 1919.

Application filed May 23, 1918. Serial No. 236,179.

*To all whom it may concern:*

Be it known that I, JOHN E. BEATTIE, a citizen of the United States, residing at New York city, in the county of New York and State of New York, have invented certain new and useful Improvements in Dampening Devices for Gyroscopic Compasses; and I do hereby declare the following to be a full, clear, and exact description of the invention, such as will enable others skilled in the art to which it appertains to make and use the same.

This invention relates to gyroscopic compasses and has for its object to provide in a compass of this nature a dampening device which will be comparatively inexpensive to construct, and more certain in operation than those heretofore proposed.

With this and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is an elevational view partly in section of a gyroscopic compass made in accordance with this invention; and Fig. 2 is a view similar to Fig. 1, but showing the parts in positions at right angles to those illustrated in Fig. 1.

It is well known that if the horizontal axis of a gyro-wheel makes an angle to the meridian, the rotation of the earth will cause it to oscillate until its movements are damped out by friction or other means. It is the main object of this invention to provide a magnetic means for accomplishing this purpose as will now be disclosed.

In the accompanying drawings, 45 represents any suitable binnacle or other means for supporting the compass on shipboard. Carried by said binnacle is the usual outer gimbal ring 46, inside of which is the inner gimbal ring 44, and said rings are joined at points 180° apart by the pivots 47 and 48, preferably mounted in the ball bearings shown. At 90° from said pivots 47 and 48 are the pivots 49 and 50, which are also 180° from each other, and which are likewise preferably mounted in a second set of ball bearings, (see Figs. 1 and 2).

Inside the inner gimbal ring 44 and carrying said pivots 49 and 50 is the frame or supporting ring 51, rigid with the upwardly extending frame member 52, and also rigid with the downwardly extending frame member 53 as shown. 54 represents an upwardly extending hollow supporting base member rigid with frame 53, 55 and 56 represent ball bearings adapted to guide the vertically disposed pivot 57, and 58 represents a so called shadow, floating ring, or member rigid with the enlargement 59 resting on the bearing 55 as shown. The pivot 57 passes upwardly through the member 59 and terminates in the ball bearing 60 carried by the ring member 61, which also carries a ball bearing 62 located 180° from the bearing 60 and in which is mounted the vertically disposed pivot 63 having its upper end terminating in the ball bearing 64 carried by the frame 52.

Inside the ring member 61 is located the directive gyro wheel casing 65, and inside said casing is located a gyro wheel 118 and suitable motor mechanism not shown for rotating the same, in a well known manner. The rotating axis of the wheel may be supposed to be journaled in the casing at the point 66, and the casing carries oppositely disposed pivots 67 which pivots are journaled in the tubular ball bearings 68 carried by tubular extensions 69 of the ring member 61.

Said extensions pass through bosses 70 and 71 on the floating ring member 58 provided with enlarged holes such as 72. Since the floating, or follow up, ring 58 must be capable of a slight movement independent of the ring 61, the holes 72, as best shown in Fig. 1, are preferably made elliptical.

It will be observed that a line 740 joining the pivots 67, or the axes of the extensions 68, pass above the center 66 of the wheel axis. In other words, the center of gravity of the wheel 118 is located below the common axis of the pivots 67 and therefore, the wheel system comprising casing 65, the motor, etc., is pendulous around the axis 740 as a center. If we suppose the center of gravity of the wheel system to be located on the line 116 perpendicular to a line joining the axes of the pivots 49 and 50, we will see at once that the center of gravity of the wheel system may oscillate around the axis 740 as a center. It follows that rolling motions of a ship in a sea way will cause precessional movements of the pivots 67 unless said movements are prevented, and that such movements will in turn cause compass errors as will presently appear.

75 represents a motor supported by the frame 52 and is provided with a pinion 76 meshing with the gear 77, carrying the pinion 78 meshing with the gear 79 mounted on the follow up or floating ring 58. 80 represents a source of current connected by the wire 81 to motor 75 and by wire 82 to the arm 83 carried by one of the extensions 69. Said arm 83 is provided with a suitable contact or roller 84 adapted to alternately make circuit with the contacts 85 and 86 respectively, joined to motor 75 by the wires 87 and 88.

The connections are so arranged that when the roller 84 makes circuit with contact 85, the motor will be so turned as to move the floating ring, or follow up member 58 in such a direction that said circuit will be immediately broken. And in like manner, when the circuit through the motor is made by the roller 84 joining the contact 86, the motor 75 will be reversed, and the follow up ring 58 will be turned in an opposite direction to immediately break said circuit.

It results in practice that the motor 75 is constantly and rapidly reversed, and that the follow up ring 58 is kept in a constant state of vibration. 90 represents an arm rigid with the follow up ring 58 and provided with an end 91 held between the springs 92 and 93 secured as at 94 to the ball bearing ring 95, supported between the collars 96 and 97 carried by the member 54. Rigid with the collar 95 are the arms 98 and 99 each terminating in a loop as shown, and in each loop is suitably mounted, as on ball bearings, a stabilizing gyroscope designated respectively by the numerals 100 and 101.

It will be observed that the said gyroscopes 100 and 101 are so disposed that their planes of rotation are at right angles to each other, and that the rings 98 and 99 are provided respectively with the pins 102 and 103 to which are attached cushioning springs, all as is illustrated in the co-pending application of G. A. Rossiter, for gyroscopic compasses filed February 5, 1918, Number 215,512. The details of these gyros 100 and 101 not being necessary to an understanding of this invention, they will not be further disclosed herein.

But since one of the properties of a gyroscope is to resist any motion tending to change its plane of rotation, it is evident, however, that the gyro 100 will resist motion around the common axes 116, of the pivots 47 and 48; that the gyro 101 will resist motion around the common axis of pivots 49 and 50 which is at right angles to said first named axis 116, and that any other motions at different angles to said common axes will be resisted by both gyros 100 and 101 in accordance with the values of said angles.

Mounted on the ring 61 are two arms 110 which pass outwardly beyond the follow up ring 58 and upwardly through openings such as 111 in the gear wheel 79. On these arms is mounted any suitable compass card 112. 113 represents a ring carried by the frame on which may be placed suitable graduations, or indications, to facilitate the reading of the card 112.

The operation of this improved gyroscopic compass, so far as has now been disclosed, is as follows:—

Referring to Fig. 2, and supposing the ship turns in azimuth, the binnacle 45 will transmit the motion to the ring 46, to pivots 47 and 48, to ring 44, to pivots 49 and 50, and to the pendulous supporting frame 53. The pivots 57 and 63 will be held stationary by the gyroscopic action of the rotating wheel 118 inside the casing 65 so that the ball bearings 55, 56 and 64 will revolve around said pivots thus generating a greater or lesser amount of friction. Any friction generated by the bearings 55 and 56 will tend to turn the follow up ring 58 in the same direction as the ship moves.

Let us suppose said ring is so moved as to cause the motor circuit to be made between the contacts 84 and 85. The motor 75 will at once be so turned as to cause said follow up ring to be moved, by means of the gears 76, 77, 78, and 79, in a direction opposite to that in which it was moved by friction; and, therefore, the pivots 57 and 63 will be subjected to a turning movement in a direction opposite to the original and any errors due to friction that may otherwise have occurred, will be corrected for. As the motor circuit will be automatically broken when the contact 85 turns to its original position, this corrective, or reverse motion of the follow up ring 58 will not only be in the right direction, to correct errors due to friction, but it will be of the right angular amount.

Should the ring 58 be moved through friction in an opposite direction, or so that the motor circuit will be made through contact 86, then the torque on the pivots 57 and 63 will be opposite to that first supposed, the follow up ring will be turned by motor 75 in a direction opposite to that just supposed, and the corrective or compensative torque will also be in an opposite direction, all in a manner well known.

So, it follows that all friction due to the movements of the ship in azimuth and to the pendulous supporting frame, relative to the gyro pivots, will be corrected, or compensated for, with the result that compass errors due to friction of all kinds will be eliminated. It will be clear that the springs 92 and 93 will prevent the oscillations of the ring 58, just disclosed, from disturbing the planes of rotation of the stabilizing gyros 100 and 101 for said oscillations are not permitted to have a value sufficient to disturb said planes.

The mechanism just disclosed will be subjected to the well known objectionable oscillations of the north end of the wheel axis 66 on each side of the north point, unless said oscillations are damped out, and it is the main purpose of this invention to provide a suitable damping means of the character that will now be described.

In order that the character of these oscillations may be clearly understood, it is said: It is well known if the axis of a weighted or eccentrically pivoted, or pendulous, gyro-wheel, such as 118, when in a horizontal position, be so turned as to make an angle with the meridian that the rotation of the earth will cause the north end of said axis to oscillate on each side of the north point, until said oscillations are damped out by friction or other means. To make this phenomena clear, we may suppose we are looking at the north end of axis 66 in Fig. 2, and that it is turned when in a horizontal plane to the left or to the northeast point. The wheel 118 with its center of gravity in its lowest position and in the vertical plane will then at first be rotating in a counter clock-wise direction. A little consideration will show, however, that the center of gravity of wheel 118 will successively reach new vertical planes in space, as the earth rotates, and that the axis 66 will no longer be perpendicular to these new vertical planes, so the center of gravity of wheel 118 will find itself displaced relative to said planes. In other words, the wheel 118 will relatively to said planes rotate around axis 740, so that said center of gravity and the north end of axis 66 will rise. This rising of said north end, will cause the pivots 67 to precess, thus carrying said north end of axis 66 toward the north point as long as it continues to rise. When said north end reaches the north point it will cease rising, the axis 66 will point north and south, and the center of gravity of the wheel will lie in the plane of the meridian, but displaced at its maximum distance from the east and west vertical plane. Therefore, the gravity couple due to said displaced center of gravity, will cause said precession to continue in the same direction as before, so that the north end of axis 66 will begin to fall toward the horizontal plane, while moving toward the northwest point. This falling motion of the said north end will continue until the horizontal plane is reached, which in this case we may say will be at the north-west point.

The axis 66 is now once more horizontal but inclined to the meridian as much as in the beginning. Accordingly, the rotation of the earth will now cause the same displacements of the center of gravity of the wheel and the same precessional action as before, but in opposite directions, so that the said north end will descend until the north point is reached, and the new gravity couple will cause the precession of the pivots 67 to carry said north end back to the north point, when it will again be in a horizontal plane.

These oscillations of the north end of axis 66 will continue, as above stated, unless damped out, and in this invention I provide the following mechanism for accomplishing the purpose. In the south-east quadrant of the shadow, or follow up ring 58, I provide the bracket 125 to which is attached the electro-magnet 126, and on the southwest quadrant of ring 58, I may attach the adjustable weight adapted to counter balance the magnet 126. The ring 58 is provided with the slot 129, the ring 61 with the slot 130, and the casing 65 is provided with the armature 131 projecting through said slots, into close proximity to said magnet. Current is supplied to said magnet from any suitable source not shown, through the wires 135 and 136.

The operation of my dampener is as follows. Suppose the axis 66 is displaced toward the north-east as above described, then when the wheel 118 and casing 65 leave the vertical plane, the armature 131 will be dragged away from the magnet 126. But owing to the attraction of said magnet the turning of said casing and wheel around axis 740 as a center will be much less with the same disturbing force than would otherwise be the case, therefore, the elevation of the north-end of axis 66 will be less and the corresponding precession of pivot 67 will be less.

Accordingly the north end of axis 66 will reach the north point sooner than if no dampening armature were provided. In the same way, the elevation of said north end of axis 66 being less, the gravity couple causing said end to continue its movement toward the north-west point will be less than would otherwise be the case, and the said north end will find itself in a horizontal plane much sooner than if no magnet and armature had been provided.

In the same way, the oscillation of said north end of axis 66 back toward the north-east point will be opposed by said magnet, for the latter will exert a drag on said armature 131 when it moves in an opposite direction tending to depress the north end of axis 66, the new gravity couple will be greatly diminished over what it would otherwise be, and thus the oscillations on each side of the north point will be rapidly damped out.

It should be observed that since the shadow, or follow up ring 58 maintains itself in the same plane as the casing 65, and since the weighted wheel causes said casing to seek the vertical plane in all latitudes as the ship moves over the earth's surface, it is evident that the normal position of said wheel and casing is a vertical one at every point on the surface of the earth, and at all times.

In the claims by the word pendulous, as applied to the wheel 118, I mean to include an eccentrically pivoted, or a weighted wheel.

It is obvious that those skilled in the art may vary the details of construction as well as the arrangement of parts without departing from the spirit of the invention, and therefore, I do not wish to be limited to the above disclosure except as may be required by the claims.

What I claim is:—

1. In a gyroscopic compass adapted to be carried on an unsteady platform, the combination of a pendulous gyroscopic directive element; pendulous supporting means therefor adapted to rotate around a vertical axis; means adapted to compensate for errors due to friction while said supporting means is moving around said axis; stabilizing means adapted to suppress precessional movements due to motions of said platform; and magnetic dampening means adapted to suppress oscillations of the north end of the axis of said directive element on each side of the north point of the horizon, substantially as described.

2. In a gyroscopic compass adapted to be carried on a rocking platform, the combination of a pendulous gyroscopic directive element; a pendulous supporting means for said element adapted to oscillate about a vertical axis; means mounting said supporting means for oscillation about a horizontal axis; gyroscopic stabilizing means adapted to suppress precessional motions due to motions of said platform; and magnetic dampening means adapted to suppress oscillations of the north end of the axis of said directive element on each side of the north point of the horizon, substantially as described.

3. In a gyroscopic compass the combination of a pendulous gyroscopic directive element; a pendulous supporting means for said element mounted for oscillation around vertical and horizontal axes; means to compensate for errors due to friction when said supporting means is moving about said vertical axis; and magnetic dampening means adapted to suppress oscillations of the north end of the axis of said directive element on each side of the north point of the horizon, substantially as described.

4. In a gyroscopic compass for use on shipboard the combination of a pendulous gyroscopic directive element; means for horizontally pivoting said element; a supporting frame; means for horizontally pivoting said supporting frame; vertical pivots for said first named means carried by said supporting frame and around which the latter is adapted to move; and magnetic dampening means adapted to suppress oscillations of the north end of the axis of said directive element on each side of the north point of the horizon, substantially as described.

5. In a ship's compass the combination of a pendulous gyroscopic directive element; a binnacle comprising a cardan suspension; a pendulous frame carried by said suspension; vertically disposed pivots carried by said frame; a follow up ring carried by said pivots; a member inside said follow up ring carried by said vertical pivots; horizontally disposed pivots carried by said member supporting said directive element; and magnetic dampening means for suppressing oscillations of said directive element on each side of the vertical plane, substantially as described.

6. In a gyroscopic compass adapted to be carried on an unsteady platform, the combination of a pendulous gyroscopic directive element provided with horizontal pivots; pendulous supporting means therefor adapted to rotate around a vertical axis; means adapted to compensate for errors due to friction while said supporting means is moving around said axis; stabilizing means adapted to suppress precessional movements due to motions of said platform; and magnetic dampening means adapted to suppress oscillations of the axis of said directive element on each side of the north point, substantially as described.

7. In a gyroscopic compass the combination of a pendulous directive element; a pendulous supporting frame for said element; a pair of angularly disposed stabilizing gyroscopes carried by said frame; and magnetic dampening means adapted to suppress oscillations of the axis of said directive element on each side of the north point, substantially as described.

8. In a gyroscopic compass the combination of a pendulous directive element; a pendulous supporting frame for said element; means to correct errors due to friction; a pair of angularly disposed stabilizing gyroscopes mounted on vertical pivots carried by said frame; and magnetic dampening means adapted to suppress oscillations of the axis of said directive element on each side of the north point, substantially as described.

9. In a gyroscopic compass the combination of a pendulous directive element; a follow up ring; a pendulous supporting frame for said element and ring; a pair of angularly disposed stabilizing gyroscopes carried by said frame and yieldingly connected to said ring; and magnetic dampening means adapted to suppress oscillations of the axis of said directive element on each side of the north point, substantially as described.

10. In a gyroscopic compass for use on a moving, unsteady, platform, the combination of a pendulous gyroscopic directive element; means associated with said element for indicating the true north; pendulous supporting means for said element adapted to assume a normal fixed position relative to the horizontal plane as the platform moves over the earth's surface; means comprising angularly disposed gyroscopic devices tending to prevent said supporting means from being moved out of its normal position by the unsteady movements of said platform; and magnetic dampening means adapted to suppress oscillations of the axis of said directive element on each side of the north point, substantially as described.

11. In a gyroscopic device for indicating the true north the combination of a gyroscopic directive element; a support for said element; a bearing adapted to turn about said support; means for compensating for errors due to friction generated between said bearing and support; a pendulous supporting frame for said last named means; a pair of angularly disposed stabilizing gyroscopic devices carried by said frame; and magnetic dampening means adapted to suppress oscillations of the axis of said directive element on each side of the north point, substantially as described.

In testimony whereof I affix my signature, in presence of two witnesses.

JOHN E. BEATTIE.

Witnesses:
  HENRY MEISOLL,
  GEO. A. ROSSITER.